(12) United States Patent
Sayana et al.

(10) Patent No.: US 8,687,561 B2
(45) Date of Patent: Apr. 1, 2014

(54) METHOD AND SYSTEM FOR LINK ADAPTATION USING METRIC FEEDBACK

(75) Inventors: Krishna Kamal Sayana, Lakemoor, IL (US); Xiangyang Zhuang, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1254 days.

(21) Appl. No.: 11/744,681

(22) Filed: May 4, 2007

(65) Prior Publication Data

US 2008/0273490 A1 Nov. 6, 2008

(51) Int. Cl.
- H04W 4/00 (2009.01)
- H04J 3/16 (2006.01)
- H04B 7/216 (2006.01)
- H04B 7/14 (2006.01)
- H04B 7/00 (2006.01)
- H04B 1/04 (2006.01)

(52) U.S. Cl.
USPC ............ 370/329; 455/24; 455/69; 455/126; 370/465; 370/335; 370/342; 370/479

(58) Field of Classification Search
USPC ............... 370/329, 465, 79, 335, 342, 479; 455/24, 69, 126
See application file for complete search history.

(56) References Cited

U.S. PATENT DOCUMENTS

| | | | |
|---|---|---|---|
| 2003/0236080 A1* | 12/2003 | Kadous et al. | 455/226.1 |
| 2004/0219883 A1 | 11/2004 | Pauli et al. | |
| 2005/0237971 A1* | 10/2005 | Skraparlis | 370/329 |
| 2006/0008020 A1 | 1/2006 | Blankenship et al. | |
| 2006/0198454 A1* | 9/2006 | Chung et al. | 375/260 |
| 2007/0298822 A1* | 12/2007 | Wan et al. | 455/509 |
| 2008/0013610 A1* | 1/2008 | Varadarajan et al. | 375/221 |
| 2008/0086662 A1* | 4/2008 | Li et al. | 714/704 |
| 2010/0029292 A1* | 2/2010 | Wan et al. | 455/452.2 |
| 2010/0061438 A1* | 3/2010 | Tan et al. | 375/227 |

FOREIGN PATENT DOCUMENTS

EP 0 899 906 A2 3/1999

OTHER PUBLICATIONS

Frank et al., "Efficient Tracking of Eigenspaces and Its Application to MIMO-Systems" (2003).*
PCT Search Report Dated Nov. 8, 2008—16 pages.
A Fading-Insensitive Performance Metric for a Unified Link Quality Model—Lei Wan et al.—Ericsson (China) Co. Ltd., China —IEEE 2006—pp. 2110-2114.
Adaptive Turbo-Coded Hybrid-ARQ in Ofdm Systems Over Fading Channels—Kingsley Otengamoako et al.—IEEE 2004—pp. 1996-2000.

(Continued)

*Primary Examiner* — Jinsong Hu
*Assistant Examiner* — Dung Hong
(74) *Attorney, Agent, or Firm* — Larry G. Brown; Sylvia Chen (57) ABSTRACT

A method for link adaptation at a base station using metric feedback is disclosed. The method can include the steps of communicating with a mobile station over a communication link having one or more sub-channels and during the communication, receiving from the mobile station information relating to one or more mutual information per coded bit metrics for one or more candidate modulation types. The mutual information per coded bit metrics can be based on channel state knowledge of the sub-channels. Also, based on the received information, the operational performance of the mobile station can be predicted in view of one or more transmission parameters and performance factors and one or more of the transmission parameters can be selected based on a transmission condition of the communication link.

12 Claims, 5 Drawing Sheets

(56) References Cited

OTHER PUBLICATIONS

IEEE, "IEEE Standard for Local and Metropolitan Area Networks—Part 16: Air Interface for Fixed and Mobile Broadband Wireless Access Systems, Amendment 2: Physical and Medium Access Control Layers for Combined Fixed and Mobile Operation in Licensed Bands, and Corrigendum 1" (IEEE Std 802 16e-2005 and IEEE 802.16/2004/Cor1-2005), Feb. 28, 2006, 822 pages.

WiMAX Forum, "WiMAX Forum Mobile Certification Waves: System Profile Features" version V1.0.0, Apr. 2006, 14 pages.

* cited by examiner

| Bits | Description | Comments |
|---|---|---|
| #0-1 | Modulation Type and offset<br>'00' → QPSK, $x = 0.0$<br>'01' → QPSK, $x = 0.5$<br>'10' → 16QAM, $x = 0.5$<br>'11' → 64QAM, $x = 0.5$ | 32 levels for QPSK for range [0..1]<br>16 levels each for 16QAM and 64QAM in the range [0.5..1]<br>$x$ = MMIB offset |
| #2-5 | MMIB of the selected modulation uniformly quantized in a range of 0.5<br>$x +$[ 1/32, 2/32,...,0.5] | |

FIG. 4

| | | | | | | | | |
|---|---|---|---|---|---|---|---|---|
| 0.1125 | 0.5625 | 0.5625 | 0.6375 | 0.5625 | 0.5625 | 0.8375 | 0.8125 | 0.5625 |
| 0.1375 | 0.5625 | 0.5625 | 0.6625 | 0.5625 | 0.5625 | 0.8375 | 0.8125 | 0.5875 |
| 0.1625 | 0.5625 | 0.5625 | 0.6875 | 0.5625 | 0.5625 | 0.8375 | 0.8125 | 0.6125 |
| 0.1875 | 0.5625 | 0.5625 | 0.7125 | 0.5625 | 0.5625 | 0.8375 | 0.8125 | 0.6375 |
| 0.2125 | 0.5625 | 0.5625 | 0.7375 | 0.5625 | 0.5625 | 0.8375 | 0.8375 | 0.5875 |
| 0.2375 | 0.5625 | 0.5625 | 0.7625 | 0.5625 | 0.5625 | 0.8375 | 0.8375 | 0.6125 |
| 0.2625 | 0.5625 | 0.5625 | 0.7875 | 0.5625 | 0.5625 | 0.8375 | 0.8375 | 0.6375 |
| 0.2875 | 0.5625 | 0.5625 | 0.8125 | 0.5625 | 0.5625 | 0.8375 | 0.8375 | 0.6625 |
| 0.3125 | 0.5625 | 0.5625 | 0.8125 | 0.5875 | 0.5625 | 0.8375 | 0.8375 | 0.6875 |
| 0.3375 | 0.5625 | 0.5625 | 0.8375 | 0.5625 | 0.5625 | 0.8375 | 0.8375 | 0.7125 |
| 0.3625 | 0.5625 | 0.5625 | 0.8375 | 0.5875 | 0.5625 | 0.8375 | 0.8375 | 0.7375 |
| 0.3875 | 0.5625 | 0.5625 | 0.8375 | 0.6125 | 0.5625 | 0.8375 | 0.8375 | 0.7625 |
| 0.4125 | 0.5625 | 0.5625 | 0.8375 | 0.6375 | 0.5625 | 0.8375 | 0.8375 | 0.7875 |
| 0.4375 | 0.5625 | 0.5625 | 0.8375 | 0.6625 | 0.5625 | 0.8375 | 0.8375 | 0.8125 |
| 0.4625 | 0.5625 | 0.5625 | 0.8375 | 0.6875 | 0.5625 | 0.8375 | 0.8375 | 0.8375 |
| 0.4875 | 0.5625 | 0.5625 | 0.8375 | 0.7125 | 0.5625 | 0.8375 | 0.8375 | 0.8625 |
| 0.5125 | 0.5625 | 0.5625 | 0.8375 | 0.7375 | 0.5625 | 0.8375 | 0.8375 | 0.8875 |
| 0.5375 | 0.5625 | 0.5625 | 0.8375 | 0.7625 | 0.5625 | 0.8375 | 0.8375 | 0.9125 |
| 0.5625 | 0.5625 | 0.5625 | 0.8375 | 0.7625 | 0.5875 | 0.8375 | 0.8375 | 0.9375 |
| 0.5875 | 0.5625 | 0.5625 | 0.8375 | 0.7875 | 0.5625 | 0.8375 | 0.8375 | 0.9625 |
| 0.6125 | 0.5625 | 0.5625 | 0.8375 | 0.7875 | 0.5875 | 0.8375 | 0.8375 | 0.9875 |
| | | | 0.8375 | 0.7875 | 0.6125 | | | |

FIG. 5 - An example predetermined metric mapping table based on joint probability distribution and limited ranges of metrics FIG. 6 – HARQ Example: MMIB Update after a Retransmission and the Required Parameters for BLER Lookup

METHOD AND SYSTEM FOR LINK ADAPTATION USING METRIC FEEDBACK

BACKGROUND OF THE INVENTION

1. Field of the Invention

The present invention concerns link adaptation and more particularly, techniques for link adaptation based on mutual information per coded bit metrics.

2. Description of the Related Art

Next generation cellular systems support multiple transmission modes, which can be used to improve the performance of such systems by adapting to current channel conditions. This process is referred to as link adaptation. Typically, these transmission modes include different modulation and coding schemes (MCS) and different multiple antenna arrangements—like beamforming, space-time coding and spatial multiplexing—as the transmission becomes simultaneously multi-dimensional in space, time and frequency domain.

To achieve the system-level gain promised by link adaptation, a base station requires the feedback of certain information from a mobile station with which the base station is communicating. It is desirable, however, to limit the amount of feedback bits assigned to a feedback channel. As such there is a trade-off between the amount of feedback and the performance improvements that can be achieved.

In one feedback technique, the mobile station selects the transmission MCS and feeds this selection back to the base station. There are, however, several disadvantages with this approach. For example, the base station may have a set of operational conditions (including packet size, target packer error rate, etc.) that are different from the assumptions made by the mobile station when the mobile station made its selections. Thus, the base station has no way of knowing if an MCS different from the one selected by the mobile station would be a better choice in view of that operational condition. A second technique is employed in which a mobile station feeds back to the base station three parameters, which the base station uses to calculate the effective signal-to-noise ratio (ESNR) for each transmission mode. This feedback method, however, is inefficient because it requires twenty-four bits of feedback and also because the mobile station must request a feedback channel through medium access control (MAC) requests.

SUMMARY OF THE INVENTION

A method for link adaptation at a base station using metric feedback is disclosed. The method can include the steps of communicating with a mobile station over a communication link having one or more sub-channels and during the communication, receiving from the mobile station information relating to one or more mutual information per coded bit (MIB) metrics for one or more candidate modulation types. The MIB metrics can be based on channel state knowledge of the sub-channels. Based on the received information, operational performance of the mobile station can be predicted in view of one or more transmission parameters and one or more performance factors. In addition, one or more of the transmission parameters can be selected based on transmission condition of the communication link.

In one arrangement, the transmission parameters can include open-loop multiple-input multiple-output (MIMO) transmission mode information or closed-loop MIMO transmission mode information and a modulation type, a coding rate or a packet size for the coding layers of the open-loop and closed-loop MIMO transmission modes. The open-loop MIMO transmission mode information and the closed-loop MIMO transmission mode information can include, for example, a number of symbol streams to be sent or a number of coding layers. Additionally, the closed-loop MIMO transmission mode information can further include closed-loop antenna beamforming weights of each symbol stream.

In one embodiment, hybrid automatic repeat request (HARQ) can be part of a scheduling at the base station, and the transmission parameters can correspond to a packet that will be combined with one or more previous transmissions. As such, predicting operational performance of the mobile station in view of one or more transmission parameters and performance factors can include—at the base station—computing a new MIB metric based on the MIB metrics received from the mobile station at different time instants corresponding to first and subsequent HARQ transmissions. The mobile station can combine the first and subsequent HARQ transmissions.

In another arrangement, the information relating to one or more MIB metrics for one or more candidate modulation types can be an index transmitted from the mobile station. The mobile station can compute the MIB metric for a single preferred candidate modulation type and can further map the single preferred candidate modulation type and the corresponding MIB metric to the index based on a predetermined table known to both the base station and the mobile station.

Alternatively, the information relating to one or more MIB metrics for one or more candidate modulation types can be an index transmitted from the mobile station in which the mobile station can compute the MIB metric for each of a plurality of candidate modulation types. The mobile station can further map these MIB metrics to the index based on a predetermined table known to both the base station and the mobile station. In this arrangement, the predetermined table known to both the base station and the mobile station can be defined based on joint probability distribution of the plurality of MIB metrics and coding rate constraints for each candidate modulation type.

In another embodiment, the step of predicting operational performance of the mobile station in view of one or more transmission parameters and performance factors can include mapping the MIB metric corresponding to a candidate modulation type to a packet error rate under potential coding rates and packet sizes. The mapping can be according to a numerically determined relationship between the MIB metric and the packet error rate or according to a parameterized relationship.

A method for link adaptation at a mobile station is also described herein. This method can include the steps of computing one or more MIB metrics for one or more candidate modulation types based on a channel state knowledge of one or more sub-channels and generating feedback information based on the MIB metrics for the candidate modulation types according to a request from a base station with which the mobile station is communicating. The method can further include the step of transmitting the generated feedback information to the base station.

As an example, computing the MIB metrics for the candidate modulation types can include the steps of computing the MIB on at least one of the sub-channels as the mutual information between each coded bit and a log-likelihood ratio of that bit based on a receiver type and averaging the MIB over one or more of the sub-channels.

As another example, computing the MIB on the subchannel can further include the steps of deriving one or more variables relating to a channel condition based on the channel state knowledge and a receiver type and mapping the variables to the MIB. In one arrangement, the variables can include a signal to noise and interference ratio (SINR) based on a receiver type. If the receiver type is a multiple-input multiple output (MIMO) receiver, the variables can further include eigenvalues, eigen-subspace powers, and a condition number of a channel state matrix.

In addition, mapping the variables to the MIB can be based on a predetermined numerical table or a function parameterized by the variables. The feedback information can be, for example, an index that the MIB metrics are mapped to based on a predetermined table known to the base station and the mobile station or can be a recommended setting for one or more transmission parameters as requested by the base station or can be a combination of both.

A base station for link adaptation that uses metric feedback is also disclosed. The base station can include a transceiver that can communicate with a mobile station over a communication link having a plurality of sub-channels. During the communication, the transceiver can receive from the mobile station information relating to one or more MIB metrics for one or more candidate modulation types in which the MIB metrics can be based on channel state knowledge of the sub-channels.

The base station can also include a performance engine coupled to the transceiver, and based on the received information, the performance engine can predict operational performance of the mobile station in view of one or more transmission parameters and performance factors. The performance engine can select one or more of the transmission parameters based on a transmission condition of the communication link. The base station can also include a memory coupled to the performance engine, and the memory can store the predetermined tables described above that are also known to the mobile station. In addition, the performance engine can predict the operational performance of the mobile station in accordance with the methods described above.

A mobile station for link adaptation using metrics is also described. The mobile station can include a transceiver for communicating with a base station and a processor coupled to the transceiver. The processor can compute one or more MIB metrics for one or more candidate modulation types based on a channel state knowledge of one or more sub-channels. The processor can also generate feedback information based on the MIB metrics for the candidate modulation types according to a request from the base station. The transceiver can transmit the generated feedback information to the base station. The processor can compute the MIB metrics in accordance with any of the methods described above. The processor can also map the variables to the MIB based on a predetermined numerical table or a function parameterized by the variables.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 4 illustrates an example of a predetermined table known to both a mobile station and a base station;

FIG. 5 illustrates another example of a predetermined table known to both a mobile station and a base station.

DETAILED DESCRIPTION OF THE INVENTION

While the specification concludes with claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled" as used herein, are defined as connected, although not necessarily directly, and not necessarily mechanically. The term "processor" or "controller" can include any component or group of components, including any relevant hardware and/or software, that can carry out the functions described in relation to the arrangements herein.

The term "mobile station" can be any portable component or group of portable components that are capable of receiving and/or transmitting communications signals. A "base station" can be any infrastructure component that is capable of exchanging wireless signals with a mobile station and can, with appropriate feedback information, predict the performance of the mobile station. A "communication link" can mean any medium over which wireless signals may travel. A "transceiver" can mean any component or group of components that are capable or transmitting and/or receiving wireless signals over a suitable medium.

A method and system for link adaptation at a base station using metric feedback is disclosed. The method can include the steps of communicating with a mobile station over a communication link having one or more sub-channels and during the communication, receiving from the mobile station information relating to one or more mutual information per coded bit metrics for one or more candidate modulation types. The mutual information per coded bit metrics can be based on channel state knowledge of the sub-channels. Also, based on the received information, the operational performance of the mobile station can be predicted in view of one or more transmission parameters and performance factors and one or more of the transmission parameters can be selected based on transmission condition of the communication link.

A method of link adaptation at a mobile station is also described. This method can include the steps of computing one or more mutual information per coded bit metrics for one or more candidate modulation types based on a channel state knowledge of one or more sub-channels and generating feedback information relating to the mutual information per coded bit metrics for the candidate modulation types according to a request from a base station with which the mobile station is communicating. The generated information can then be transmitted to the base station.

In view of these methods, efficient link adaptation can be performed with minimal feedback overhead. In fact, the feedback information can be transmitted over existing or future feedback channels without requiring any exchange of MAC requests or assignment of additional channels required for effective SNR metrics. Nonetheless, a base station is still enabled to predict the performance of a mobile station based on this efficient feedback metric to permit the base station to select one or more transmission parameters.

Figure 1:
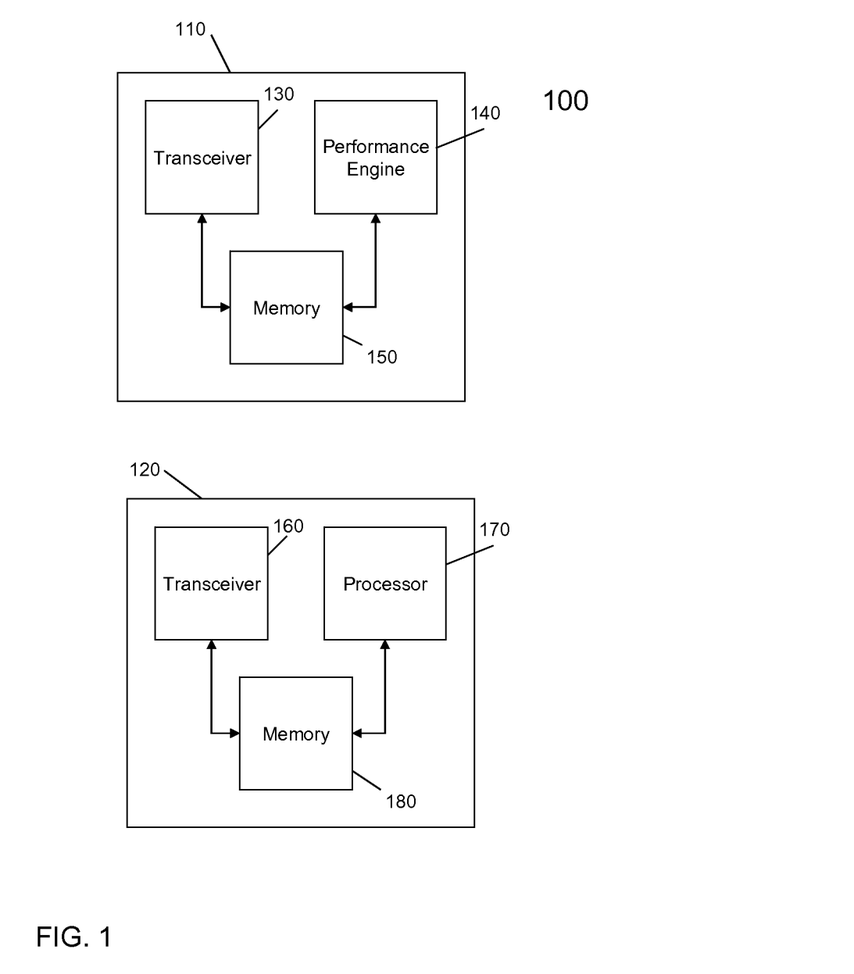
FIG. 1 illustrates an example of a communication system.

Referring to FIG. 1, a communication system 100 is shown in which a base station 110 is in wireless communications with a mobile station 120. The base station 110 can be part of any suitable communications network that can facilitate communications between the mobile station 120 and the communication network. As an example, the base station 110 and the mobile station 120 can communicate with one another over a communication link that supports multiple transmission modes, as the transmissions between the base station 110 and the mobile station 120 can be simultaneously multi-dimensional in space, time and frequency domains.

In one arrangement, the base station 110 can include a transceiver 130, a performance engine 140 and a memory 150 in which the engine 140 can be coupled to both the transceiver 130 and the memory 150. In addition, the mobile station 120 can include a transceiver 160, a processor 170 and a memory 180 in which the processor 170 can be coupled to both the transceiver 160 and the memory 180. As those of skill in the art will appreciate, the base station 110 and the mobile station 120 can exchange wireless signals over the communication link through the transceivers 130 and 160. As part of this exchange, the mobile station 120 can feed back to the base station 110 information relating to one or more mutual information per coded bit metrics for one or more candidate modulation types, which can be generated by the processor 170. As part of this generation, the processor 170 may access relevant information from the memory 180.

In response, the performance engine 140 can—by accessing relevant material from the memory 150—predict the operational performance of the mobile station in view of one or more transmission parameters and performance factors. The performance engine 140 can then select one or more of the transmission parameters based on a transmission condition of the communication link, which enables the process of link adaptation.

In another arrangement, the processor 170 can computing one or more MIB metrics for one or more candidate modulation types based on a channel state knowledge of one or more sub-channels. The processor 170 can also generate feedback information based on the MIB metrics for the candidate modulation types according to a request from the base station 110. Further discussion relating to these processes will be presented below.

Figure 2:
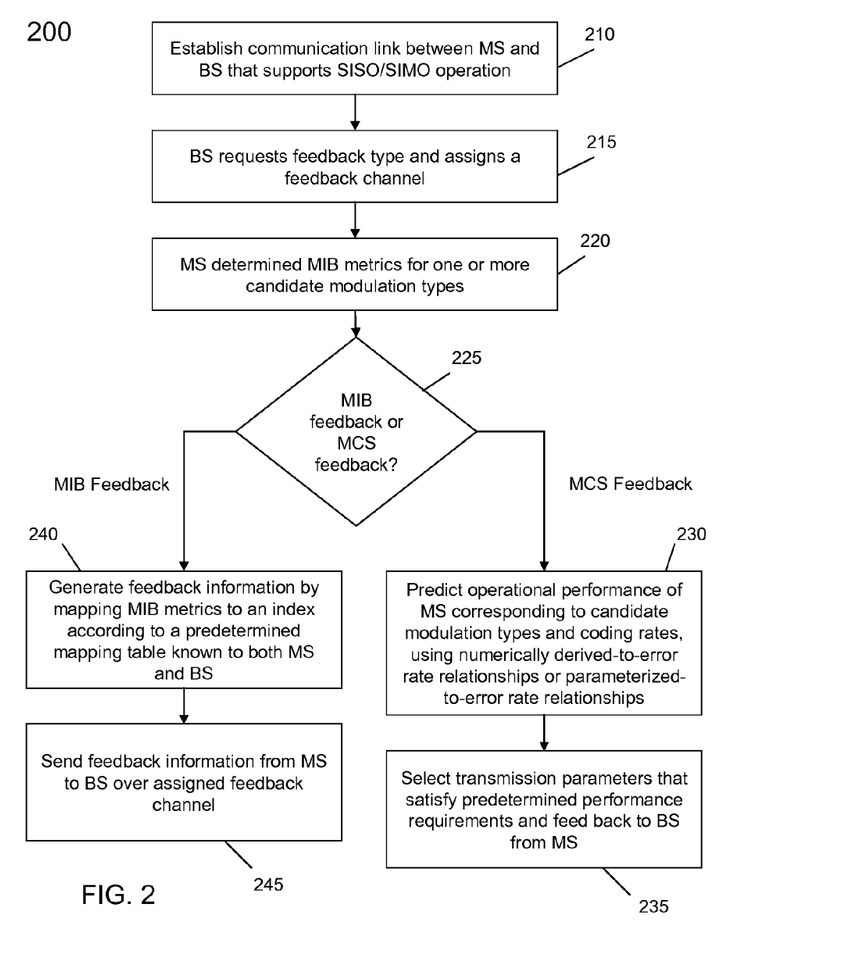
FIG. 2 illustrates an example of operations occurring at a mobile station.

Referring to FIG. 2, a method 200 for link adaptation at a mobile station is shown. This method 200 focuses on the processes that can occur at the mobile station 120 of FIG. 1, particularly if the base station 110 supports single-output/single-input (SISO) or single-input/multiple output (SIMO) operation, although it must be understood that the method 200 can be practiced in any other suitable system or component using any other suitable transmission mode or technique. The steps of the method 200—or any other method presented below—are not limited to the particular order in which they are presented in the figures. Moreover, any of these methods can have a greater number of steps or a fewer number of steps than those shown in the figures.

At step 210, a communication link can be established between, for example, the base station 110 and the mobile station 120 in which the base station supports SISO or SIMO operation. This communication link can include one or more sub-channels, and as noted earlier, can be multi-dimensional in nature. At step 215, the base station 110 can request a particular type of feedback (to be described below) to be sent from the mobile station 120 and can assign a feedback channel. As an example, the base station 110 can assign a six-bit fast feedback channel, such as that found in the 802.16e standard.

At step 220, the mobile station 120, for example, can determine one or more mutual information per coded bit (MIB) metrics for one or more candidate modulation types. A candidate modulation type is a possible modulation scheme that can be employed between a base station and a mobile station over a wireless link. Suitable examples, as will be described later, include quadrature phase shift keying (QPSK) 16-bit quadrature amplitude modulation (16-QAM) and 64-bit quadrature amplitude modulation (64-QAM), although other modulation schemes are within the scope of the claimed subject matter.

The number of MIB metrics computed at step 220 generally depends on, for example, the number of candidate modulation types, but it could also depend on the feedback type that the base station requested. As an example, the base station 110 can request the MIB metric for a particular modulation type (e.g., 64 QAM) or all modulation types. Alternatively, the base station 110 could request the mobile station 120 to recommend a preferred modulation type along with the associated MIB metric, in which case the mobile station 120 may choose to compute the MIB metrics for all modulation types, even though it only feeds back one. In another example, the base station 110 could request just the preferred MCS, which contains the information of a preferred modulation type and one of the allowed coding rates for that modulation type. Such an MCS request mechanism is specified in the current IEEE 802.16e standard.

The MIB determination can be based on, for example, channel state knowledge of the sub-channels. In a typical arrangement, the mobile station 120 can estimate the channel state knowledge, which refers to the channel responses at the sub-channels, using certain reference signals transmitted from the base station 110. The channel responses contain the amplitude and phase information of the channels between each of the transmission antennas at the base station 110 and each of the receive antennas at the mobile station 120. Therefore, the channel state knowledge at a sub-channel can be a complex scalar in a SISO case or a complex vector in SIMO or multiple-input/single-output (MISO) cases. The channel state knowledge can also be a complex matrix in multiple-input/multiple-output (MIMO) transmission.

Depending on the transmission scheme, there may be different receiver types. Hence, the MIB metrics computed at step 220, in addition to being for candidate modulation types, can be related to a receiver type. A receiver type can be defined as a receiving processing method in light of a particular transmission scheme, such as SIMO or MIMO. For a given transmission scheme, multiple possible processing methods may exist. For example, for MIMO matrix-B mode in IEEE802.16e, a maximal likelihood (ML) or a minimum mean squared error (MMSE) receiver processing can be used.

The MIB metric can be the mutual information between coded bits and corresponding bit LLRs (Log-Likelihood Ratio) input to a binary decoder. The coded bits are from the binary encoder that precedes the mapping of bits into symbols according to a modulation type (e.g., BPSK, QPSK, 16 QAM, 64 QAM, etc.). The symbols are then sent from the base station 110 according to the transmission schemes, and after the symbols are transmitted over the channel, the receiver will compute the bit LLR of each coded bit based on the estimated channel knowledge. The bit LLR can be the output of a receiver processing and LLR computation engine. If "bit channels" are used to refer to the total effect between the input to modulation mapping and the output of the receiver processing and LLR computation engine, each bit comprising the modulation (e.g., 4 bits comprising each 16 QAM symbols) experiences its own bit channel. The MIB metric can be referred to as the mutual information of those bit channels.

In one arrangement, the MIB metric can have a value between 0 and 1 and can reflect an ideal coding rate that can be approximately supported by a transmitter, if there is an ideal encoder and decoder. As an example, for SISO operation, the MIB can be expressed by the following formula:

$$I(b, LLR) = \frac{1}{m}\sum_{i=1}^{m} I(b_i, LLR(b_i))$$

where $I(b_i, LLR(b_i))$ is the mutual information between the coded bit and the LLR for $i^{th}$ bit of a modulation type. As an example, there are m=2, 4 or 6 bits corresponding to QPSK, 16 QAM, and 64 QAM modulation, respectively. The mobile station 120 can compute the MIB metric for one or more of the modulation types, according to the need to satisfy the request from the base station 110. For example, the base station 110 can request the MIB just for a particular modulation type (e.g., m=6), or the base station 110 may request the mobile station 120 to recommend a preferred modulation type, in which case the mobile station 120 may choose to compute the MIB for all modulation types in order to make a selection.

Referring again to step 220, during the computation of the MIB metric for one or more candidate modulation types, the mobile station may compute the MIB metric on at least one of the sub-channels. The mobile station 120 can then average the MIB metric over one or more of the sub-channels. The above $I(b_i, LLR(b_i))$ function can be computed on a sub-channel basis. When the communication is over a channel comprising multiple sub-channels, as described earlier, the MIB may need to be averaged over a number of sub-channels to reflect the overall communication link quality.

In some cases, however, where the channel state knowledge or the qualities of sub-channels are similar, the MIB in one sub-channel may be sufficient. Also note that it is not necessary to compute the MIB on all the sub-channels. As an example, a subset of all sub-channels can be used. The MIB metric computed by the mobile station 120 could be more precisely referred to as mean MIB or MMIB in this case, but for convenience and clarity, the term mutual information per coded bits or MIB is used in both cases, i.e., with or without averaging.

Considering another aspect of the computation of the MIB metrics, the mobile station 120 may first derive one or more variables based on the channel state knowledge and a receiver type. In the case of SISO/SIMO transmission, a single variable could be derived, which is often some form of Signal to Noise and Interference Ratio (SINR), which can be easily derived from the channel state knowledge and the receiver type, as is well known in the art. The SINR variable is appropriate to represent channel condition on a subchannel and the SINR typically should represent the SINR after a certain receiver processing, i.e., to reflect the quality of a subchannel accounting for a specific receiver type.

For MIMO transmission, one or more variables could be derived, based on one or more of the following parameters: eigenvalues, eigen-subspace powers, and a condition number of a channel state matrix. Other suitable parameters may be applicable here.

As another part of the computation of the MIB metrics, the mobile station 120 can map the variables to an MIB value based on a predetermined numerical table. As an example, the table, which can store a set of MIB values corresponding to a set of variable values, can be constructed based on numerical simulation.

As another embodiment, the MIB metric can also be approximated as a function parameterized by one or more variables. For example, the function can be a linear combination of certain "basis" functions, each of which can be parameterized by one or more variables. For example, in the case of SISO or SIMO, one variable is needed, which may be the SINR of the sub-channel. The MIB metric in this case is shown below:

$$I(x) = \sum_{i=1}^{K} a_i J(c_i \gamma) \quad \sum_i a_i = 1$$

where $c_1 \ldots c_K$ are pre-computed scalars, $\gamma$ is the SINR of the sub-channel, and the MIB metric is a weighted sum (by scalar "$a_i$") of K basis functions (i.e., J function).

A basis function may correspond to the MIB metric of a binary phase shift keying (BPSK) modulation (denoted as "J" function above). The J function is known in the art and is a nonlinear function but has a closed-form expression for computational purposes. It is also possible to store a numerical table for the whole function should one choose the approach to compute J function.

The particular example of using a function built upon a J basis function and parameterized by the variables can be obtained by approximating a Probability Distribution Function (PDF) of a conditional LLR as a mixture of Gaussian distributions, which is shown in the following formula:

$$\text{Mixture of Gaussians} \rightarrow I(x) = \sum_{i=1}^{K} a_i J(c_i x) \quad \sum_i a_i = 1$$

As an example, the equation below provides numerically-derived functions to obtain the MIBs for three different modulation types given the SNR on a subchannel. The parameterized functions are found to be a good approximation of the MIB metrics. In general, the approximations depend on the specific constellation mappings for each supported modulation type.

$$I_2(\gamma) = J(2\sqrt{\gamma})$$

$$I_4(\gamma) = \frac{1}{2}J(0.8\sqrt{\gamma}) + \frac{1}{4}J(2.17\sqrt{\gamma}) + \frac{1}{4}J(0.965\sqrt{\gamma})$$

-continued $$I_6(\gamma) = \frac{1}{3}J(1.47\sqrt{\gamma}) + \frac{1}{3}J(0.529\sqrt{\gamma}) + \frac{1}{3}J(0.366\sqrt{\gamma})$$

Information relating to the MIB metrics can be sent from the mobile station 120 to the base station 110, and there are several ways that this can be performed, as described earlier. For example, at decision step 225, it can be determined whether the base station 110 has requested a process of modulation-coding scheme (MCS) feedback or MIB feedback. In summary, an MCS feedback includes the mobile station 120 selecting the modulation type and forwarding it and other relevant information to the base station 110 over the feedback channel. Conversely, the MIB feedback model involves the mobile station 120 not selecting the modulation type but forwarding information (along with other data) to the base station 110 to allow the base station 110 to select the modulation type. It is also possible for the base station 110 to request a combination of both types of feedback here. As an example, the preferred modulation type and the associated MIB can be requested.

If the MCS feedback is requested, at step 230, the operational performance of the mobile station 120 can be predicted, for example, corresponding to candidate modulation types and coding rates, using numerically derived-to-error rate relationships or parameterized metric-to-error rate relationships, as described earlier. This particular process can be conducted at the mobile station 120. The candidate modulation types and the coding rates can be referred to as transmission parameters, while an error rate can refer to a performance factor. A transmission parameter can be defined as any parameter that affects the characteristics of a transmission, while a performance factor can be any factor whose affect on a transmission can be measured. It is understood, however, that a transmission parameter is not limited to modulation types or coding rates and that a performance factor is not limited to an error rate.

Focusing on step 230, the prediction of operational performance, using MIB metrics for one or more candidate modulation types, can use a functional relationship between an MIB metric and an error rate. Consider, for example, a Gaussian cumulative model to approximate the functional relationship using three parameters:

$$y = \frac{a}{2}\left[1 - \text{erf}\left(\frac{x-b}{\sqrt{2}\,c}\right)\right], \quad c \neq 0$$

where "erf" is an error function well known in the art, a is a transition height, b is a transition center and c is related to a transition width (transition width is equal to 1.349c) of a Gaussian cumulative distribution. In a linear packet error rate (PER) domain, the parameter a can be set to one, and the mapping only requires two parameters, which can be pre-computed and stored for supported modulation types, code rates and packet sizes. A further simplification to the above functional relationship is to make it independent of the modulation type.

As another method to predict the performance using MIB metrics, a numerically derived MIB-to-error rate relationship can be used, i.e., using a lookup table to perform the error-rate mapping, where a set of error rates are stored corresponding to a set of MIB metrics, and the error rate for a metric is obtained by well-known linear interpolation methods.

Once the performance is predicted, at step 235 of FIG. 2, the transmission parameters that satisfy predetermined performance requirements can be chosen and fed back from the mobile station 110 to the base station. For example, predetermined performance requirements can be a target PER rate for a certain packet size. The base station 110 may also signal these requirements to the mobile station 120 when setting up at the connection. A description of what the base station 110 can do with this feedback information is recited below.

Moving back to decision step 225, if the base station 110 has request the MIB feedback technique, at step 240, feedback information can be generated by, for example, mapping MIB metrics to an index. In one arrangement, this mapping can be according to a predetermined mapping table known to the base station 110 and to the mobile station 120. In addition, the generation of this feedback information can occur at the mobile station 120. At step 245, the feedback information can be sent over the assigned feedback channel, such as from the mobile station 120 to the base station 110.

The construction of a predetermined mapping known to both the base station and the base station will be described now. In particular, the computed one or more MIB metrics is mapped to an index to an entry of a predetermined mapping table, which can include a plurality of indices. The table can be constructed based on certain system parameters that enable efficient transmission of the feedback information using a small number of feedback bits. When the MIB metrics are mapped to the predetermined mapping table, an index of the mapping table can be selected, which can serve as the feedback information. In one arrangement, the number of indices in the predetermined mapping table can have a value of $2^b$, where b is the size of the feedback channel. As an example, the 802.16(e) standard allows for a fast feedback channel that supports six bit feedback. In this case, the number of indices in the mapping table can equal $2^6$, or sixty-four indices.

In addition to the processes described in relation to method 200, there are several other alternatives to consider. For example, a communication link may be established between the base station 110 and the mobile station 120 in which the base station 110 supports multiple MIMO transmission, such as open-loop MIMO or closed-loop MIMO operation. There are additional transmission parameters that are relevant to MIMO operation, such as the open-loop and closed-loop MIMO transmission mode information including, but not limited to, a number of symbol streams to be sent, a number of coding layers, and the closed-loop MIMO transmission mode information further includes closed-loop antenna beamforming weights of each symbol stream (also referred to as "pre-coding" weights).

In this case, the base station 110 may request feedback under a particular MIMO transmission mode. For example, only the MCS feedback for a particular open-loop MIMO scheme may be requested (e.g., matrix-A or matrix-B as specified in the IEEE 802.16e standard). As such, using a potential transmission mode and certain parameters, a modified channel quality can be obtained at the mobile station 120, such as the SINR after considering the receiver processing. The mobile station 120, based on the requested MIMO transmission mode, can then compute MIB metrics for one or more candidate modulation types per coding layer. Once the MIB metrics are computed, the rest of the operation at the mobile station is similar to the SISO/SIMO processes described in relation to method 200. Specifically, relevant information can be fed back from the mobile station 120 to the base station 110, depending on which feedback technique the base station 110 has requested.

In another arrangement, the base station 110 may request feedback of recommended MIMO transmission parameters. Specifically, the mobile station 120 can compute MIB metrics for one or more candidate modulation types and candidate MIMO transmission modes and can use these MIB metrics to determine one or more performance factors with different MIMO transmission parameters. The mobile station 120 can then select a preferred set of such transmission parameters. For this operation, the mobile station 120 can use a parameterized relationship or a numerically derived look-up table relationship to predict the performance based on MIB metrics, as discussed earlier. The mobile station 120 can then feed back to the base station the selected MIMO transmission parameters, also in accordance with the discussion above.

As noted earlier, the computation of the MIB metrics may be related to receiver type. For example, the receiver type may be a SISO/SIMO receiver or a MIMO linear receiver (e.g., MMSE). In this case, SNRs can be derived taking into account the transmission mode and the receiver type.

A maximum likelihood MIMO receiver is another receiver type. In this case, the MIB metric computation can be modified as follows. A set of Gaussian means corresponding to the mixture Gaussian distribution can be derived based on the MIMO channel matrix on the sub-channel (matrix entries correspond to the channel form each transmit to receive antenna). In particular, the Gaussian means are derived based on one or more variables relating to the channel condition. For example, the variables can be the eigenvalues, eigen subspace powers, and a condition number of the channel state matrix.

As an example, eigen values and eigen subspace powers can be obtained for a 2 transmit antenna and a 2 receive antenna channel. A first step performs an Eigen value decomposition of the channel matrix:

$$H^H H = V D V^H$$

where V is the matrix consisting of eigenvectors and D is a diagonal matrix containing the two eigenvalues. From this decomposition, the following three variables can be obtained, which can then be used to obtain conditional means as described above:

$\lambda_{min}$—Minimum Eigen Value
$\lambda_{max}$—Maximum Eigen Value
$p_a$—Eigen Mode Power distribution parameter=$\min\{p, 1-p\}$
where $$|V| \cdot |V| = \begin{pmatrix} p & 1-p \\ 1-p & p \end{pmatrix}, 0 \leq p \leq 1$$

The MIB metric is then derived by using a sum of J approximation, as follows:

$$H \rightarrow [\gamma_1, \gamma_2, \gamma_3, \dots, \gamma_K]$$

$$I(H) = \sum_{i=1}^{K} a_i J(c_i \gamma_i), \quad a_1 + a_2 + a_3 + \dots + a_K = 1$$

If more than one coding layer is supported, corresponding number of metrics are obtained with a similar approach.

Figure 3:
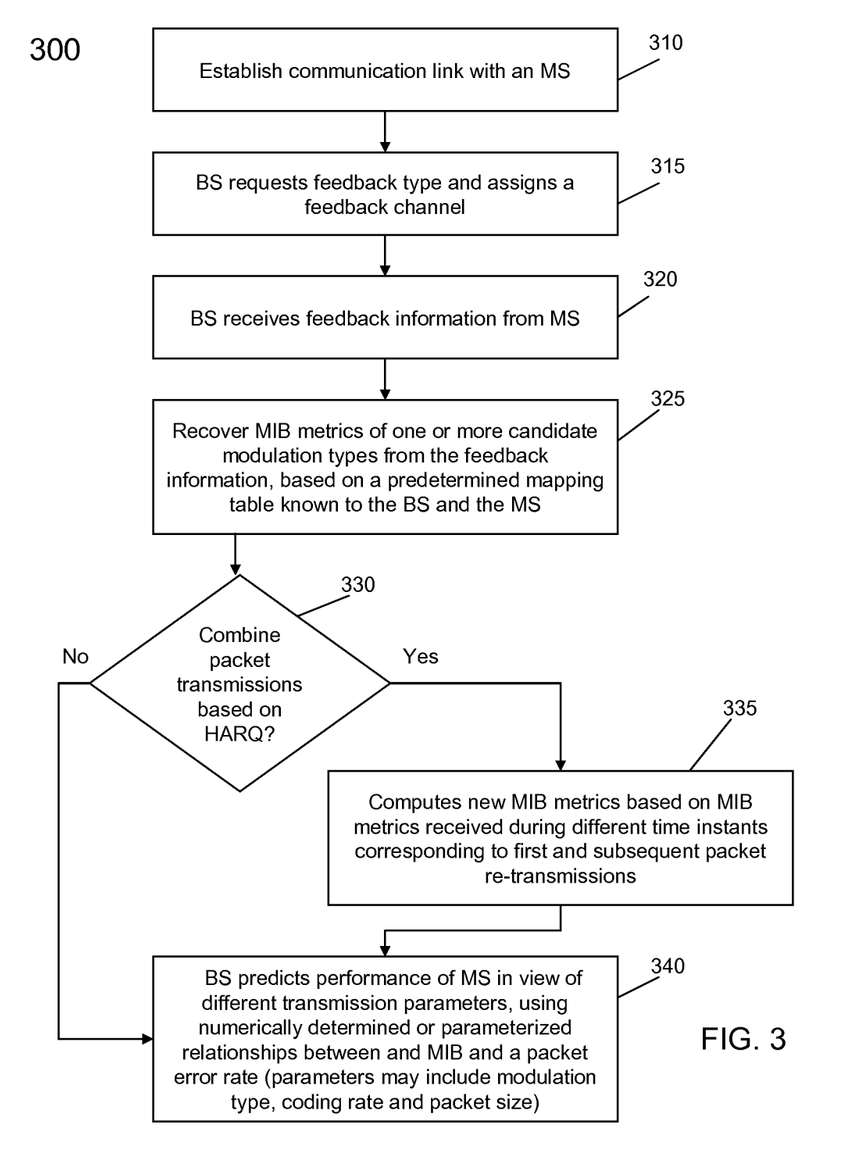
FIG. 3 illustrates an example of operations occurring at a base station.

Referring to FIG. 3, a method 300 of link adaptation at the base station 110 using feedback metrics is shown. The method 300 is an example of how the base station 110 can process the feedback information that the base station 110 receives from the mobile station 120. The method 300 also applies to both SISO/SIMO and MIMO transmission modes, as will be described. Similar to the method 200 of FIG. 2, at step 310, a communication link can be established with the mobile station 120, and at step 315, the base station 110, for example, can request a feedback type and can assign a feedback channel. The base station 110 can receive the feedback information from the mobile station 120, as shown at step 320.

As noted earlier, the base station 110 may request either of or a combination of two types of feedback information from the mobile station 120, an MCS feedback scheme and an MIB feedback process. The base station 110 can directly use the MCS feedback information. If MIB feedback information is sent to the base station 110, then at step 325, the base station 110, based on either one of these techniques, can recover MIB metrics of one or more candidate modulation types from the feedback information, which can be based on a predetermined mapping table known to the base station 110 and the mobile station 120. This predetermined mapping table can be the same mapping table described in relation to the operation described above for the mobile station 110. The design of an example of such a table will be discussed in this section.

In an embodiment of the method, based on a pre-determined table known to both the base station and the mobile station, the MIB metrics of one or more candidate modulation types can be mapped to an index (feedback information). The index can be transmitted on the assigned feedback channel and can correspond to one of the $2^b$ indices supported by a b-bit feedback channel. In one arrangement, the index may contain the information of a single preferred modulation type using, for example, 2 bits of the b bits, and using the rest of bits to convey the quantized metric value corresponding to that modulation type. Finer quantization of the metric can be obtained if more bits can be used.

Finer quantization can also be achieved by reducing the quantization range of the metric. It is possible to reduce the range based on the supported coding rates at the base station. A range that is slightly larger than the allowable coding rate range is often sufficient. For example, the coding rates and the corresponding modified metric ranges are shown below for several modulation types:

QPSK→[0.1–0.85] ($R_{min}=1/12, R_{max}=3/4$)

16 QAM→[0.5–0.85] ($R_{min}=1/2, R_{max}=3/4$)

64 QAM→[0.55–1] ($R_{min}=1/2, R_{max}=5/6$)

Although not intended to be limiting, a particular example of the predetermined table is illustrated in FIG. 4, constructed based on the methods described above, where reduced quantization ranges of [0,1],[0.5,1],[0.5,1] are used for metrics corresponding to QPSK, 16 QAM and 64 QAM, respectively.

In another embodiment, the three MIB metrics as a group may be mapped to a feedback index according to a table where each entry can represent a group of three metrics (each with a particular value). To reduce the number of feedback bits, the joint probability distribution of the metrics can be observed in the construction of such table. The joint probability distribution can represent the probabilities of the MIB metrics taking on particular respective values. The distribution may be obtained via numerical simulation. By choosing $2^b$ sets of values that have the largest sum probability of occurrence (referred to as typical set below), the feedback can be limited to b bits, while still providing accurate feedback in all practical situations.

$$\text{Typical Set} = \underset{\{i_1, i_2, \dots, i_{2^b}\}}{\operatorname{argmax}} \sum_{j=1}^{2^b} P(i_j)$$

Additional constraints can be observed to further to limit the range of MIBs for each candidate modulation type. Such additional constraints could include the allowable coding rates under each modulation type as defined in a standard.

A particular example of a predetermined table, constructed based on the approach described above, is shown in FIG. 5, for M=40 quantization levels and b=6 bits. Constraints on coding rates are also considered here. Each of the 64 entries of the table contains a group of 3 MIB metrics corresponding to modulation types QPSK, 16 QAM and 64 QAM. Each entry (i.e., a set of three MIB metrics) is associated with an index of 6 bits, for example, according to the entry's index position in the table. The mobile station 120 can compute the MIB metrics for one or more candidate modulation types (three MIBs in the example of FIG. 5) and can select an entry where the associated MIB metrics best match the computed MIB metrics, according to certain criteria, such as minimal squared distance over the three metrics.

The base station 110 may include HARQ as part of its scheduling. As is known in the art, in the event of the receipt of a faulty packet, HARQ permits the combining of the faulty packet with a subsequent packet, which can increase the chances of a successful transmission. As is also known in the art, one type of HARQ retransmission is a simple repetition of the first transmitted packet, and the associated combining is commonly referred to as chase combining. Another well known type of HARQ operation is incremental redundancy (IR), where subsequent packets may not have the same coded bits as the previous packets. If each re-transmission is not individually decodable, then combining is required at the mobile station 120. Otherwise, a mobile station 120 can drop the previous packets and not necessarily perform HARQ. Thus, at decision step 330, it can be determined whether a packet to be transmitted from the base station 110 to the mobile station 120 is to be combined with previously transmitted packet.

If the combination is to occur, then the base station 110 may need to determine the transmission parameters of the subsequent packet. In order to do that, the base station 110 can first compute a new MIB metric based on the MIB metrics received during different time instants corresponding to first and subsequent packet re-transmissions, as shown at step 335

Figure 6:
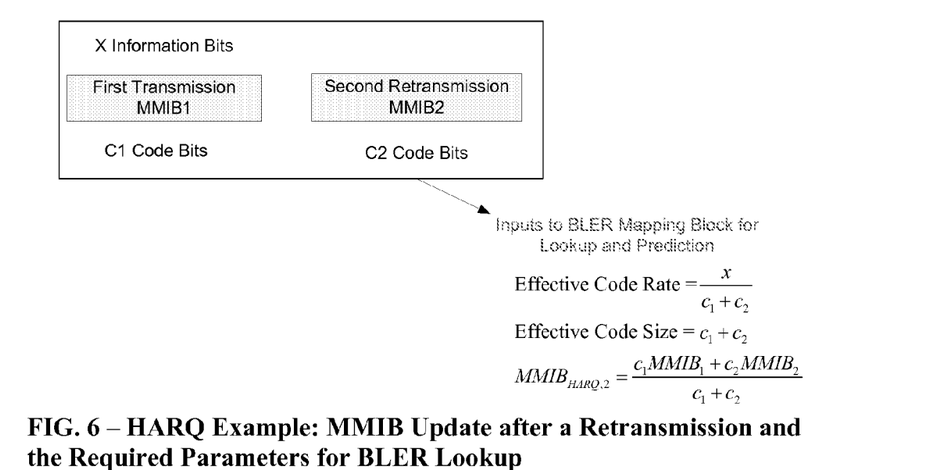
FIG. 6 illustrates an example of the computation of a new metric.

For example, as illustrated in FIG. 6, the new mutual information metric can be computed as $$MIB_{HARQ} = \frac{\sum_{i=1}^{N} c_i MIB_i}{\sum_{i=1}^{N} c_i}$$

where $c_i$ is the number of coded bits in the i-th transmission and $MIB_i$ is the mutual information per coded bit metric corresponding to the i-th transmission. Further, the metric to error rate mapping (step 340 as will be described in detail later) can take into account a new effective code rate and a new code size to reflect combined decoding. For example, if the information packet size has "x" bits, then we can have ("p" transmissions are assumed in the equation):

$$\text{Effective Code Rate} = \frac{x}{c_1 + c_2 + \dots c_P}$$

$$\text{Effecttive Code Size} = c_1 + c_2 + \dots c_P$$

After step 335 or if no combination of transmissions will occur, the method 300 resumes at step 340, where the base station 110 can predict the performance of the mobile station 120 in view of different transmission parameters, using numerically determined or parameterized relationships between an MIB and a packet error rate. For example, the transmission parameters may include modulation type, coding rate and packet size. Such numerical and parameterized relationships have been explained before in detail with regard to similar operation at the mobile station 120.

A variation of the above method for MIMO transmission, in which a base station 110 may prefer a particular MIMO transmission mode and hence request metric feedback for this particular mode, is now described. A base station 110 can also request multiple metrics for multiple candidate MIMO modes, via assigning multiple feedback channels. In addition, if a requested MIMO mode has multiple coding layers, MIB metric feedback can be requested for each coding layer. The per-layer MIB metrics can then be used to select transmission parameters, like modulation type, coding rate and packet size based on a predicted performance using parameterized or numerically determined relationship between an MIB and a packet error rate.

In another arrangement, the base station 110 may request the mobile station 120 to also feedback a recommendation of MIMO transmission mode information. Such MIMO transmission mode information can include open loop or closed loop MIMO transmission schemes, number of coding layers, number of symbol streams and antenna beamforming weights vector (also known as "preceding" vector), in the case of closed-loop MIMO transmission. The base station 110 can then receive a mobile recommended MIMO transmission mode and the corresponding MIB metrics and can select the appropriate MCS for each coding layer, as previously explained.

The metric in this specification is referred to as MIB. Further it is understood that mutual information per bit (MIB) is computed for a sub-channel and the MIB metric when averaged over more than one sub-channels can be referred to as mean MIB (MMIB). For convenience, MIB is used in all situations.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for link adaptation at a base station using metric feedback, comprising:
    communicating with a mobile station over a communication link having one or more sub-channels using hybrid automatic repeat request (HARQ);
    during the communication, receiving from the mobile station a plurality of mutual information per coded bit metrics for a plurality of candidate modulation types, wherein the plurality of mutual information per coded bit metrics are based on channel state knowledge of the one or more sub-channels;
    based on the plurality of mutual information per coded bit metrics, computing a new mutual information per coded bit metric corresponding to first and subsequent HARQ transmissions taking into account a new effective code rate and a new code size, wherein the mobile station is to combine the first and subsequent HARQ transmissions;

predicting operational performance of the mobile station in view of one or more transmission parameters corresponding to the first and subsequent HARQ transmissions and one or more performance factors; and selecting one or more of the transmission parameters based on the predicting.

2. The method according to claim 1, wherein the transmission parameters include open-loop multiple-input multiple-output (MIMO) transmission mode information or closed-loop MIMO transmission mode information and a modulation type, a coding rate or a packet size for the coding layers of the open-loop and closed-loop MIMO transmission modes.

3. The method according to claim 2, wherein the open-loop MIMO transmission mode information and the closed-loop MIMO transmission mode information include a number of symbol streams to be sent or a number of coding layers and the closed-loop MIMO transmission mode information further includes closed-loop antenna beamforming weights of each symbol stream.

4. The method according to claim 1, wherein the plurality of mutual information per coded bit metrics is received as an index from the mobile station.

5. The method according to claim 4, wherein the index references a predetermined table known to both the base station, and the mobile station is defined based on different quantization ranges for mutual information per coded bit metrics of each candidate modulation type.

6. The method according to claim 4, wherein the index is mapped into a bit field.

7. A method for link adaptation at a base station using metric feedback, comprising:

communicating with a mobile station over a communication link having one or more sub-channels;

during the communication, receiving from the mobile station a plurality of mutual information per coded bit metrics for a plurality of candidate modulation types, wherein the plurality of mutual information per coded bit metrics are based on channel state knowledge of the one or more sub-channels;

based on the plurality of mutual information per coded bit metrics, predicting operational performance of the mobile station in view of one or more transmission parameters by mapping a mutual information per coded bit metric corresponding to a candidate modulation type to a packet error rate under potential coding rates and packet sizes according to a parameterized relationship defined as $$y = \frac{a}{2}\left[1 - \mathrm{erf}\left(\frac{x-b}{\sqrt{2}\,c}\right)\right], c \neq 0$$

wherein "y" is the packet error rate, "x" is the mutual information per coded bit metric corresponding to a candidate modulation type, "erf" is an error function, and "a", "b", and "c" are stored parameters; and selecting one or more of the transmission parameters based on the predicting.

8. A method for link adaptation at a mobile station, comprising:

for each candidate modulation type of a plurality of candidate modulation types, computing a mutual information per coded bit on at least one sub-channel as the mutual information between each coded bit and a log-likelihood ratio of that bit based on a receiver type and one or more of: eigenvalues, eigen-subspace powers, and a condition number of a channel state matrix, wherein the eigen values and the eigen-subspace powers are used to obtain a minimum eigen value, a maximum eigen value, and an eigen mode power distribution parameter;

averaging the mutual information per coded bit over one or more of the sub-channels;

generating feedback information, wherein the feedback information includes the plurality of mutual information per coded bit metrics for the plurality of candidate modulation types according to a request from a base station with which the mobile station is communicating; and transmitting the generated feedback information to the base station.

9. The method according to claim 8, wherein mapping the variables to the mutual information per coded bit is based on a predetermined numerical table or a function parameterized by the variables.

10. The method according to claim 8, wherein the feedback information is an index that the mutual information per coded bit metrics are mapped to based on a predetermined table known to the base station and the mobile station or is a recommended setting for one or more transmission parameters as requested by the base station or is a combination of both.

11. The method according to claim 8, wherein the minimum eigen value, the maximum eigen vale, and the eigen mode power distribution parameters are used to calculate conditional means.

12. A mobile station for link adaptation using metrics, comprising:

a transceiver for communicating with a base station; and a processor coupled to the transceiver, wherein the processor:

computes a plurality of mutual information per coded bit metrics for a plurality of candidate modulation types based on a channel state knowledge of one or more sub-channels by:

deriving one or more variables relating to channel condition based on the channel state knowledge and a receiver type; and mapping the one or more variables to the mutual information per coded bit I(H) of a measured channel H as $$H \rightarrow [\gamma_1, \gamma_2, \gamma_3, \ldots, \gamma_K]$$

$$I(H) = \sum_{i=1}^{K} a_i J(c_i \gamma_i),$$

$$a_1 + a_2 + a_3 + \ldots + a_K = 1$$

wherein $J(\bullet)$ is a basis function, K is a number of basis functions $J(\bullet)$ that are used in the numerical approximation, $a_i$ and $c_i$ are pre-computed scalars, and $\gamma_i$ is a variable based on one or more parameters comprising signal to noise and interference ratio, eigen values, eigen vectors, eigen-subspace powers or condition number, each of which are derived from the channel H; and generates feedback information based on the plurality of mutual information per coded bit metrics, wherein the transceiver transmits the feedback information to the base station.

* * * * *